June 18, 1968
I. LEVINE
3,388,497
RODENT EXTERMINATORS
Filed Jan. 25, 1966
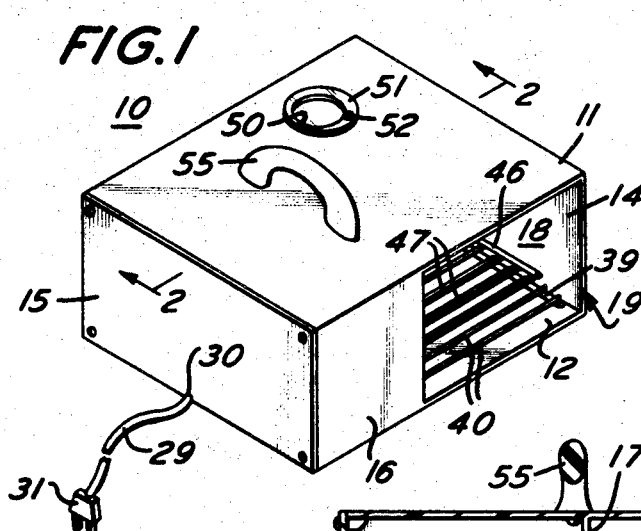
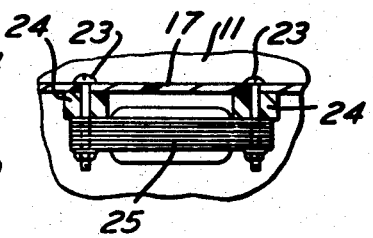
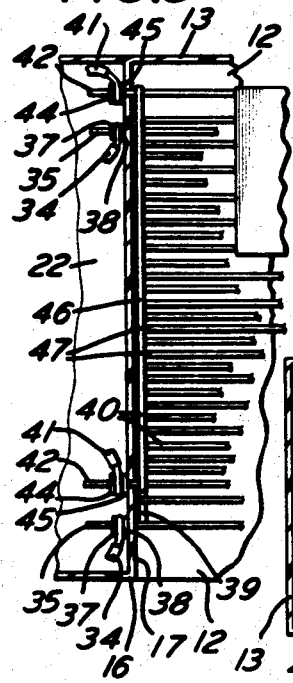
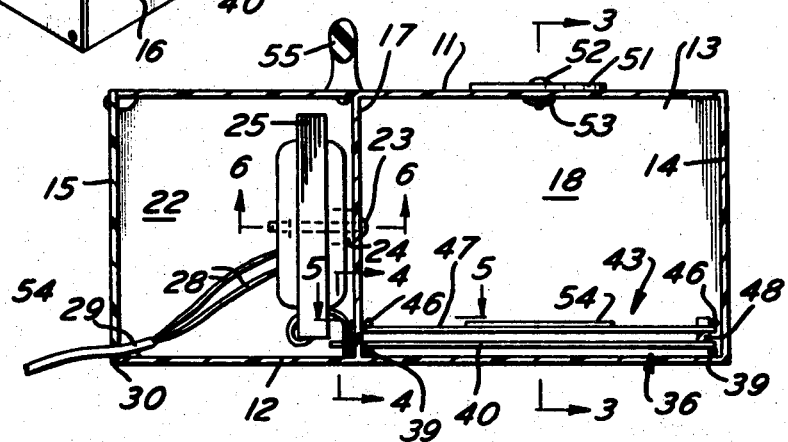
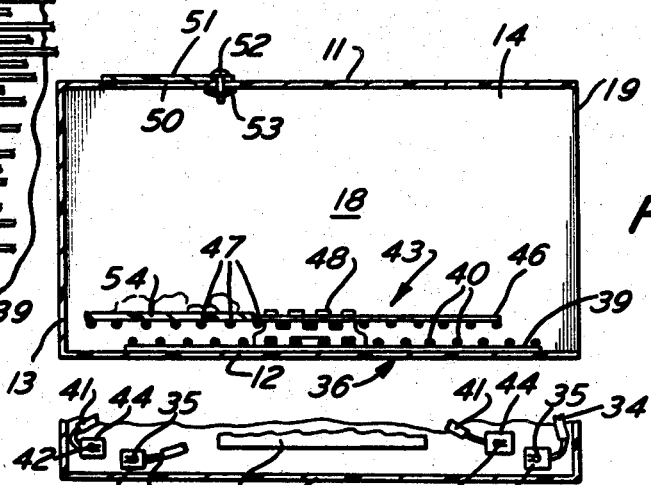
INVENTOR.
IRVING LEVINE
BY
ATTORNEY

United States Patent Office 3,388,497
Patented June 18, 1968

3,388,497
RODENT EXTERMINATORS
Irving Levine, Ventnor, N.J., assignor to Castle Tool Specialty Company, Inc., Lansdowne, Pa., a corporation of Pennsylvania
Filed Jan. 25, 1966, Ser. No. 522,963
8 Claims. (Cl. 43—98)

This invention relates to rodent exterminators.

Various exterminators for rodents have heretofore been proposed but these have had various shortcomings. Some of the exterminators heretofore proposed were of complex and expensive construction. Others were difficult to maintain in operation or in a continued state of readiness.

It is the principal object of the present invention to provide a portable rodent exterminator which is particularly useful for rats and mice, and which is simple in construction and effective in its operation.

It is a further object of the present invention to provide a rodent exterminator having a minimum of components, which components are simple to construct, easy to assemble, and which will have an effective action over a long period of time.

It is a further object of the present invention to provide a rodent exterminator for electrocution of rodents which requires only insertion of suitable bait and plugging into an ordinary household convenience outlet to be ready for use.

Other objects and advantageous features of the invention will be apparent from the description and claims.

The nature and characteristic features of the invention will be more readily understood from the following description taken in connection with the accompanying drawings forming part thereof, in which:

FIGURE 1 is a view in perspective of a rodent exterminator in accordance with the invention;

FIG. 2 is a transverse vertical sectional view, enlarged, taken approximately on the line 2—2 of FIG. 1;

FIG. 3 is a vertical sectional view taken approximately on the line 3—3 of FIG. 2;

FIG. 4 is a vertical sectional view taken approximately on the line 4—4 of FIG. 2;

FIG. 5 is a horizontal sectional view taken approximately on the line 5—5 of FIG. 2; and FIG. 6 is a horizontal sectional view taken approximately on the line 6—6 of FIG. 2.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings the rodent exterminator in accordance with the invention preferably incldues an outer casing 10 preferably of synthetic plastic material having good electric insulating properties, as well as adequate strength and physical shock resistance. The casing 10 preferably has a top and bottom walls 11 and 12, a vertical rear wall 13, a fixed side wall 14, a removable side wall 15, a short front wall 16, and an intermediate vertical partition wall 17 which extends from the rear wall 13 to the front wall 16.

The side wall 14, top and bottom walls 11 and 12, rear wall 13 and partitional wall 17 define a space 18 with an open front 19 for access and entry by the rodent.

The side wall 14 can be held in place in any desired manner such as by screws 20 which engage in internal bosses 21.

The side wall 14, with the top and bottom walls 11 and 12 the rear wall 13, the front wall 16 and the partition wall 17 define a normally closed space 22.

Within the space 22, and preferably held onto the partitional wall 17 by screws 23, an alternating current transformer 25 is provided, spaced from the wall 17 by insulating collars 24. The transformer 25 can be of any desired characteristics but for a particular embodiment, with a primary of 115 volts alternating current at 60 cycles, the secondary can have an output of 2500 volts and 5 milliamperes.

The transformer 25 has connected to the primary winding thereof input leads 28 which have an enclosing cover 29 and exend through an opening 30 in the wall 15 and to a pronged plug 31 for insertion into a conventional 115 volt A.C. convenience oulet (not shown) at the desired location of use.

The transformer 25 has one side of the secondary thereof connected by conductors 34 to rods 35 which are end rods of a lower metal grill or electrode 36. The rods 35 extend through the partition wall 17 and in the space 22 have the conductors 34 secured thereto in any desired manner, such as by friction spring clips 37 with back up washers 38.

The rods 35 preferably rest on and are secured to end frame rods 39. The rods 39 between the rods 35 and the space 18 have spaced parallel rods 40 secured thereto. The end frame rods 39 preferably rest on the bottom wall 12.

The transformer 25 has the other side of the secondary thereof connected by conductors 41 to rods 42 which are end rods of an upper metal grill or electrode 43 and which extend through the partition wall 17. The rods 42 in the space 22 have the conductors 41 secured thereto in any desired manner, such as by friction spring clips 44 with back up washers 45.

The rods 42 preferably are secured to end frame rods 46. The rods 46 between the rods 42 and in the space 18, have spaced parallel rods 47 secured thereto, preferably in staggered relation to the rods 40.

A support block member 48 of insulating material, such as synthetic plastic, and with upper and lower slots to accommodate the rods 40 and the rods 47 can be provided remote from the partition wall 17 for aiding in holding the grill 43 in spaced relation to the grill 36.

The top wall 11 preferably close to the rear wall 13, has a bait supply opening 50 with a closure 51, preferably of transparent material pivotally carried on a pivot pin 52 and with a friction spring clip 53 engaging the pin 52 for holding the same in assembled relation. The grill 43 beneath the opening 50 preferably has a bait receiving platform 54 carried thereon and secured thereto in any desired manner such as by an adhesive (not shown).

The top wall 11 preferably has a handle 55 mounted thereon for manually moving the exterminator to the place of use and for handling the same as desired.

The mode of use will now be pointed out.

Any suitable bait, in accordance with the rodents to be attracted is supplied at the platform 54 through the bait supply opening 50 and the closure 51 is turned to a closed position.

The casing 10 is faced in the desired direction, with the opening 19 at a desired location and with bait on the platform 54, the plug 31 is plugged into a convenience receptacle (not shown) at which 115 volt A.C. current is available.

The exterminator will remain in a quiescent condition with very minute current consumption.

If now, a rodent is attracted by the bait on the bait platform 54, it enters the space 18 through the opening 19. As the rodent enters its feet, and particularly its front feet tend to slip from the rods 47 of the upper grill or electrode 43 and move toward one of the rods 40 of the lower grill or electrode 36. As the feet of the rodent move toward or upon engagement with one of the lower rods 40 and with the limbs or body of the rodent engaging one or more of the rods 47, the secondary voltage differential as between the upper and lower grills or electrodes 43 and 36 is effective for electrocuting the rodent and the current flow, upon charring of the rodent and increasing of the gap will be discontinued.

The casing 10, after disconnection of the plug 31, can be readily moved by grasping the handle 55. If the electrocuted rodent is inside the space 18 the casing 10 can be used to move the rodent to a waste receptacle (not shown) or the like. The electrocuted rodent can also be removed in any other desired manner.

The exterminator, if bait is on or placed on the bait platform 54, is ready for reuse.

I claim:

1. A rodent exterminator comprising
   a casing having bottom, rear, side and top walls,
   an interior partition wall separating the interior of the casing into a plurality of spaces, one of which is an open front rodent access space,
   a lower horizontally disposed grill member in said rodent access space,
   an upper horizontally disposed grill member in said rodent access space insulated from but closely spaced with respect to said lower grill member,
   means connecting said grill members at one end to said partition wall,
   said grill members providing electrodes for simultaneous contact by a rodent,
   electric current supply means in said casing having output connections respectively connected to said grill members to impose a voltage differential thereon, and
   a bait receiving platform in said rodent access space spaced from said open front.

2. A rodent exterminator as defined in claim 1 in which
   one of said walls has a bait supply opening for access to said bait receiving platform.

3. A rodent exterminator as defined in claim 2 in which
   said bait receiving platform is carried by one of said grill members.

4. A rodent exterminator as defined in claim 1 in which
   at least one of said grill members has portions extending through said partition wall and providing said connecting means, and
   securing elements are provided on said portions in the other of said spaces.

5. A rodent exterminator as defined in claim 4 in which
   the upper of said grill members remote from said partition wall has an insulating supporting and spacing member in engagement therewith.

6. A rodent exterminator as defined in claim 1 in which
   each of said grill members has rod portions extending through said partition wall and providing said connecting means,
   securing elements are provided on said rod portions in the other of said spaces, and
   said electric current supply means includes a transformer in the other of said spaces.

7. A rodent exterminator as defined in claim 1 in which
   each of said grill members is provided with a plurality of parallel rods, and
   the rods of one grill member are offset with respect to the rods of the other grill member.

8. A rodent exterminator as defined in claim 1 in which
   each of said grill members is provided with a plurality of parallel rods,
   each of said grill members has rod portions extending through said partition wall into said other space and providing said connecting means,
   the rods of one grill member are offset with respect to the rods of the other grill member in said rodent access space,
   said grill members in said rodent access space having a separator element therebetween,
   said rod portions in the other of said spaces having securing elements thereon,
   said electric current supply means includes a transformer in the other of said spaces,
   said electric current supply means includes a cord for connection to a source of electric energy, and
   said casing has a handle thereon for initial placing of the exterminator and for removal with a rodent in said rodent access space.

References Cited

UNITED STATES PATENTS

| | | | |
|---|---|---|---|
| 1,031,492 | 7/1912 | Tuch | 43—98 |
| 1,899,199 | 2/1933 | Kaiser | 43—98 |
| 3,197,916 | 8/1965 | Cole et al. | 43—98 |

ALDRICH F. MEDBERY, *Primary Examiner.*

SAMUEL KOREN, WARNER H. CAMP, *Examiners.*